United States Patent [19] [11] Patent Number: 4,873,156
Satake et al. [45] Date of Patent: Oct. 10, 1989

[54] SOLID ELECTROLYTIC FUEL CELL AND METHOD FOR MANUFACTURING SAME

[75] Inventors: Tokuki Satake; Hiroshi Sakai; Hayami Nakatani; Masaharu Nakamori; Masaru Ishibashi, all of Hyogo, Japan

[73] Assignee: Mitsubishi Jukogyo Kabushiki Kaisha, Tokyo, Japan

[21] Appl. No.: 102,652

[22] Filed: Sep. 30, 1987

[30] Foreign Application Priority Data

Sep. 30, 1986 [JP] Japan .................. 61-232781
Dec. 17, 1986 [JP] Japan .................. 61-300710

[51] Int. Cl.⁴ .............................. H01M 8/10
[52] U.S. Cl. ........................... 429/31; 429/40
[58] Field of Search ......................... 429/31, 40

[56] References Cited

U.S. PATENT DOCUMENTS 3,402,230 9/1968 White .................................. 429/31
3,668,010 6/1972 Fally et al. ........................... 429/31
4,174,260 11/1979 Schmidberger ...................... 429/31
4,490,444 12/1984 Isenberg ............................... 429/31
4,631,238 12/1986 Ruka .................................... 429/31

FOREIGN PATENT DOCUMENTS 0824261 9/1969 Canada ............................... 429/31

Primary Examiner—Donald L. Walton
Attorney, Agent, or Firm—Birch, Stewart, Kolasch & Birch

[57] ABSTRACT

A cylindrical solid electrolytic fuel cell which includes an oxygen electrode constituting the innermost layer of the fuel cell and having a thickness of 1 mm or more, a solid electrolyte covering the outer peripheral surface of the oxygen electrode, and a fuel electrode covering the outer peripheral surface of the solid electrolyte, is disclosed.

4 Claims, 2 Drawing Sheets

SOLID ELECTROLYTIC FUEL CELL AND METHOD FOR MANUFACTURING SAME

FIELD OF THE INVENTION AND RELATED ART STATEMENT

The present invention relates to a fuel cell using a solid electrolyte which is one kind of fuel cell, in which an easily oxidized gas such as hydrogen or carbon monoxide is used as a fuel to electrochemically directly generate electric power, and it relates further to a method for manufacturing the fuel cell.

Presently, typical examples of the well-known cylindrical solid electrolytic fuel cells (hereinafter referred to simply as SOFC) are described in Japanese Patent Provisional Publication No. 73246/1979 (hereinafter referred to as Conventional Example 1) and Japanese Patent Provisional Publication No. 130381/1982 (hereinafter referred to as Conventional Example 2). In any conventional example, when YSZ (yttria-stabilized zirconia) is used as the solid electrolyte, and when heating is continued at about 1,000° C., $O^{2-}$ which has resulted from the reaction $\frac{1}{2}O_2 + 2e^- \rightarrow O^{2-}$ penetrates through the solid electrolyte. The oxygen ion is reacted, on the surface of the solid eletrolyte, with an easily oxidized gas such as hydrogen, carbon monoxide or the like coming through the fuel cell. In this case, if the fuel is a hydrogen gas, electrons run therethrough in accordance with $O^{2-} + H_2 \rightarrow H_2O + 2e-$, so that electric energy can be directly taken out from the cell.

However, in the case of Conventional Example 1, the respective cell units of the fuel cell have a large electrical resistance, since electric current runs therethrough in a cylindrical axial direction. Further, a rigid substrate pipe in the cell has a relatively large wall thickness and is made from a material such as porous alumina, and additionally the outer surface of the pipe is usually covered with a fuel electrode of a material such as NiO, then with a solid electrolyte such as YSZ (yttria-stabilized zirconia), and moreover with an oxygen electrode comprising a perovskite type oxide having an electron-ion mixture conductivity such as $LaCoO_3$. However, the usual perovskite type oxide which is well known is physically and structurally unstable and therefore impedes the life prolongation of SOFC.

In view of these facts, Conventional Example 2 adopts the construction that the oxygen electrode is changed with the fuel electrode, i.e., that the outside layer and the outermost layer of the substrate pipe are composed of the oxygen electrode and the fuel electrode, respectively, so that the oxygen electrode is confined thereunder with the intention of extending the SOFC lifetime.

Furthermore, in Conventional Example 2, the electric current runs in a peripheral direction, and the diameter of the cell is smaller than in Conventional Example 1, whereby the attempt is made to decrease the electric resistance of the cell and to thereby diminish the internal resistance of the cell. As the current is larger, an oxygen electrode having a smaller resistance is desired. However, in Conventional Example 2, since a film must be closely (in a desirable case, combined or in a similar state) formed around the substrate pipe, various covering techniques have been tried, but from the viewpoint of preventing a peeling phenomenon, the electrode should be relatively thin, and for example, its thickness is limited to the range of several ten microns to several hundred microns. Presently, it is impossible to diminish the electrical resistance of the oxygen electrode below a certain level, even though expensive materials are used.

Further, it is desired that in point of a thermal expansion coefficient, the substrate pipe having the function of sustaining the films of the respective layers is as close as possible to the electrode material and the electrolyte, and for this reason, expensive materials such as YSZ (yttria-stabilized zirconia) and CSZ (calcia-stabilized zirconia) are used of late. Additionally, in this conventional example, a pad such as nickel felt must be used to electrically bond the cell units with each other, and thus there is the problem of vibration resistance, in contrast to Conventional Example 1.

Heretofore, in order to cover the solid electrolyte or the substrate pipe with the oxygen electrode, a technique such as flame spraying, sputtering, slurry coating, CVD or EVD has been used, but in such a technique, the thickness of the formed oxygen electrode is limited to at most 700 microns or so. Hence, by the conventional technique, it is hard to obtain the oxygen electrode having a thickness of this level or higher.

OBJECT AND SUMMARY OF THE INVENTION

The present invention intends to provide ar inexpensive SOFC by which the drawbacks of the above-mentioned conventional fuel cells are overcome and in which an oxygen electrode is constructed so as to be thicker than in the conventional cases and there is utilized the principle that an electrical resistance is directly proportional to length and is inversely proportional to area.

That is, the present invention is directed to a cylindrical solid electrolytic fuel cell which is comprises an oxygen electrode constituting the innermost layer of the fuel cell and having a thickness of 1 mm or more; a solid electrolyte covering the outer peripheral surface of the oxygen electrode; and a fuel electrode covering the outer peripheral surface of the solid electrolyte.

Further, the present invention is directed to a cylindrical solid electrolytic fuel cell which is comprises an oxygen electrode constituting the innermost layer of the fuel cell and having a thickness of 1 mm or more; an intermediate connector attached to the outer peripheral surface of the oxygen electrode in an axial direction; a solid electrolyte covering the outer peripheral surface of the oxygen electrode, the solid electrolyte having the intermediate connector interposed therein; and a fuel electrode covering the outer peripheral surface of the solid electrolyte, the intermediate connector and the fuel electrode being spaced.

Therefore, the formation of the cylindrical solid electrolytic fuel cell can be achieved as follows: An innermost layer of the fuel cell is formed with an oxygen electrode having a thickness of 1 mm or more, and the whole outer peripheral surface of this oxygen electrode is covered with a solid electrolyte. Further, the whole outer peripheral surface of the solid electrolyte is covered with a fuel electrode, and a groove is then provided in the solid electrolyte and the fuel electrode. Afterward, an intermediate connector is inserted in the groove so as to be connected to the oxygen electrode and the solid electrolyte.

Furthermore, the present invention is directed to a cylindrical solid electrolytic fuel cell which is comprises oxygen electrodes constituting the innermost layers of the fuel cell and having a thickness of 1 mm or more; solid electrolytes connecting the oxygen electrolytes in series with the interposition of electrical insulators and covering the outer peripheral surfaces of the oxygen electrodes; and fuel electrodes covering the outer peripheral surfaces of the solid electrolytes.

Therefore, the formation of the cylindrical solid electrolytic fuel cell can be achieved as follows: Innermost layers of the fuel cell are formed with oxygen electrodes having a thickness of 1 mm or more, and the substantially whole outer peripheral surfaces of the oxygen electrodes are covered with solid electrolytes. Further, the substantially whole outer peripheral surfaces of the solid electrolytes are covered with fuel electrodes, whereby the solid electrolytes and the fuel electrodes are connected directly to the oxygen electrodes, alternatively if necessary, intermediate connectors are interposed between the oxygen electrodes and the fuel electrodes so that the oxygen electrodes may be connected to the fuel electrodes.

The present invention is constructed as described above, and therefore in the cylindrical SOFC, a substrate pipe is omitted, and the innermost of the cell is formed with the oxygen electrode and the outermost part thereof is formed with the intermediate connector and the fuel electrode. In addition, for the purpose of decreasing electrical resistance, the oxygen electrode is thickened so as to provide it with a rigidity and to also increase its sectional area.

Since the present invention has a construction as discussed above, materials having a relatively poor electron conductivity can be used, and since the substrate pipe is eliminated, a more inexpensive SOFC can be provided. In addition, since in covering the oxygen electrode with the solid electrolyte and the fuel electrode, it is unnecessary to mask the portion of the intermediate connector as in the case of conventional fuel cells, a manufacturing process can be curtailed remarkably.

DETAILED DESCRIPTION OF PREFERRED EMBODIMENT

Figure 1:
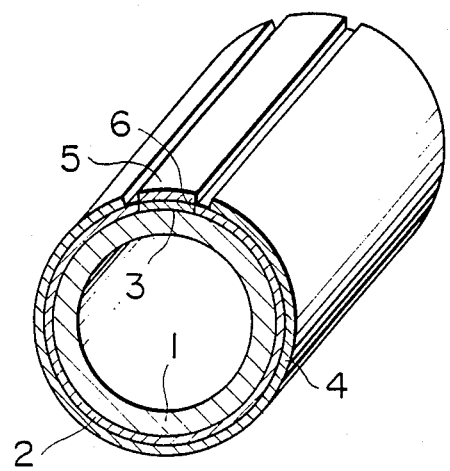
FIG. 1 is a perspective view illustrating one embodiment of a solid electrolytic fuel cell of the present invention.

FIG. 1 is a perspective view illustrating one embodiment of the present invention.

In this embodiment, a cylindrical oxygen electrode 1 is made from a porous perovskite type oxide, and as a material for the oxygen electrode 1, Ti,Ca, Fe or the like which is inexpensive can be used in place of Co, Mn or the like which is expensive.

When such an inexpensive material is selected, the layer of the oxygen electrode 1 is thickened up to a level of 1 mm or more, since the electrode 1 made therefrom has a large electrical resistance. In the case of conventional techniques, the thickness of the oxygen electrode is limited to 700 microns, at most 1 mm or less, because the oxygen electrode is used to closely cover a substrate pipe. In contrast to the conventional technique, however, the present invention permits forming the oxygen electrode 1 in an independent manner, and therefore various means such as compression, calcination and the like can be employed, with the result that the oxygen electrode 1 can be constructed so that its wall thickness may be 1 mm or more.

The perovskite oxides of Ti, Ca, Fe and the like, for example, $CaTiO_3$ and the like are poorer in conductivity as compared with $LaCoO_3$ and $LaMnO_3$, but they are very inexpensive, and when sintered, they can have sufficient rigidity. Further, since the sectional area of the oxygen electrode 1 is increased, the merit of the present invention concerns more than the compensation of the drawback that the electrical resistance is large.

Due to the formation of the oxygen electrode 1 having a large thickness and a great rigidity, the manufacturing process of the fuel cell becomes more easier than in the conventional cases. According to the present invention, the oxygen electrode 1 itself has great rigidity and a large wall thickness, and therefore the oxygen electrode 1 can be covered with a solid electrolyte 2 and a fuel electrode 4 in a cylindrical form and afterward a groove 6 having a minimum width, which is necessary to receive intermediate connectors 3 and 5 therein, can be provided in the solid electrolyte 2 and the fuel cell 4 by means of etching or a mechanical treatment. As a result, the manufacturing process of the fuel cell becomes shorter and simpler than the conventional procedure in which the thin-layer oxygen electrode is covered with the solid electrolyte and the fuel electrode by means of flame spraying or the like, and thus it is required to always mask the portion of the intermediate connector.

As is apparent from the foregoing, in the present invention, the oxygen electrode 1 simultaneously having the function of a substrate pip is covered with the solid electrolyte 2 and the fuel electrode 4, the groove 6 is provided therein, and the intermediate connector 3 which is resistant to an oxidizing atmosphere and the intermediate connector 5 which is resistant to a reducing atmosphere are mounted in the groove 6, the intermediate connector 5 being slightly separated from the fuel electrode 4 and being superimposed over the intermediate connector 3, whereby one cell unit of the fuel cell is constructed.

The above-mentioned method permits obtaining the solid electrolytic fuel cell in which electric current flows in a peripheral direction.

Figure 2:
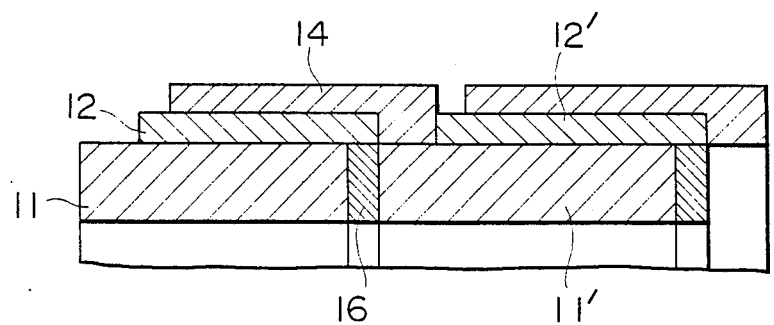
FIG. 2 is a cross-sectional view of another embodiment of the cell of the present invention.
Figure 3:
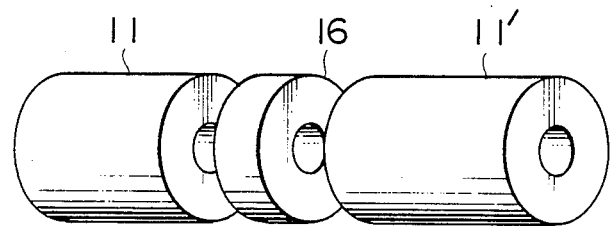
FIG. 3 is an exploded perspective view illustrating a structure between oxygen electrodes of the present invention.
Figure 4:
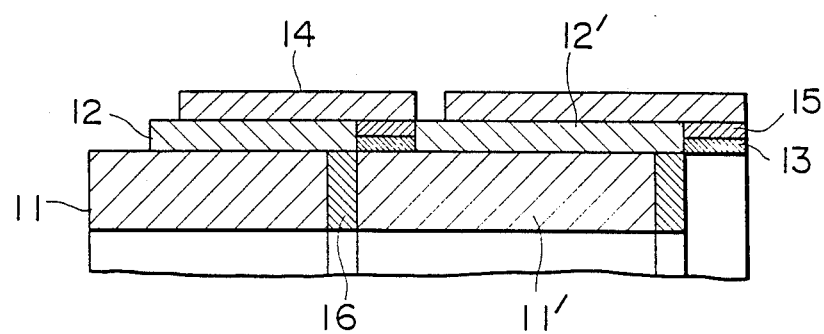
FIG. 4 is a partial cross-sectional view of still another embodiment of the cell of the present invention.

FIGS. 2 to 4 attached hereto show embodiments of the solid electrolytic fuel cell of the present invention in which electric current flows in an axial direction and in which the respective cell units are connected to each other in the axial direction.

In these drawings, reference numeral 11 is an oxygen electrode, and numeral 11' is another oxygen electrode connecting axially to the oxygen electrode 11. Numerals 12, 12' are solid electrolytes covering the outer peripheral surfaces of these oxygen electrodes 11, 11', and 14 is a fuel electrode. Numeral 16 is an electrical insulator interposed between the oxygen electrodes 11, 11'. The bonding between the oxygen electrodes 11 and 11' can be carried out by usual pressure welding or the like, an electrical insulator 16 such as $Al_2O_3$ being interposed between the oxygen electrodes. However, in order to increase a reliability, an electric bonding process may be used. That is, an adhesive containing an oxide of a rare earth element is put between the electrical insulator 16 and the oxygen electrode 11, and a high voltage of several hundred to several thousand volts is applied to the thus joined surface between the insulator 16 and the electrode 11, so that electric current flows therethrough. Additionally, another bonding means such as a halide process may be utilized.

As is apparent from the foregoing, in the present invention, the outer peripheral surface of the oxygen electrode 11 simultaneously having the function of a substrate pipe is covered with the solid electrolyte 12 and the fuel electrode 14 so that the oxygen electrode 11' may be directly connected to the fuel electrode 14. However, the respective electrodes are porous, and therefore a gas escapes from the bonded portion therebetween, though the amount of the escaped gas is small. Hence, in order to maintain a more airtight state, the construction shown in FIG. 4 may be used. That is, in FIG. 4, an intermediate connector 13 which is resistant to an oxidizing atmosphere and another intermediate connector 15 which is resistant to a reducing atmosphere are disposed between the oxygen electrode 11' and the fuel electrode 14 in a vertical direction and between the solid electrolytes 12 and 12' in a horizontal direction, thereby constituting one cell unit of the fuel cell. The employment of the intermediate connectors 13 and 15 should be decided taking the increase in the process and the requirements of the airtight state into consideration, but this is a problem of design.

According to the present invention, since the oxygen electrode itself additionally has the function of a substrate pipe, one of the cell-constituting members can be omitted, with the result that the manufacturing process can be curtailed. Further, the employment of an inexpensive material is possible, and therefore an economical product can be obtained. Furthermore, since the structural strength of the oxygen electrode is increased, the lifetime of the cell can be prolonged and the stabilization of the cell can be expected. As a consequence, it is fair to say that the present invention can contribute greatly to the development of the industry.

We claim:

1. A cylindrical solid electrolytic fuel cell which comprises:
    at least an oxygen electrode which is a porous cylinder of $CaTiO_3$ forming an innermost layer of said fuel cell and having a thickness of 1 mm or more;
    at least a solid electrolyte covering an outer peripheral surface of said oxygen electrode;
    at least a fuel electrode covering an outer peripheral surface of said solid electrolyte; and
    an intermediate connector attached to said outer peripheral surface of said oxygen electrode in the axial direction;
    wherein said solid electrolyte has said intermediate connector interposed therein, and said intermediate connector and said fuel electrode are spaced.

2. The cylindrical solid electrolytic fuel cell according to claim 1, wherein said intermediate connector has a first section attached to said outer peripheral surface of said oxygen electrode, which can withstand an oxidation atmosphere, and a second section, located between said first section and said fuel electrode, which can withstand a reduction atmosphere.

3. A cylindrical solid electrolytic fuel cell which comprises:
    at least an oxygen electrode forming an innermost layer of said fuel cell and having a thickness of 1 mm or more;
    at least a solid electrolyte covering an outer peripheral surface of said oxygen electrode;
    at least a fuel electrode covering an outer peripheral surface of said solid electrolyte; and
    an intermediate connector attached to said outer peripheral surface of said oxygen electrode in the axial direction, said intermediate connector having a first section attached to said outer peripheral surface of said oxygen electrode, which can withstand an oxidation atmosphere, and a second section, located between said first section and said fuel electrode, which can withstand a reduction atmosphere;
    wherein said solid electrolyte has said intermediate connector interposed therein, and said intermediate connector and said fuel electrode are spaced.

4. The cylindrical solid electrolytic fuel cell according to claim 3, wherein said perovskite-type oxide is $CaTiO_3$.

* * * * *